US007466842B2

(12) United States Patent
Tuzel et al.

(10) Patent No.: US 7,466,842 B2
(45) Date of Patent: Dec. 16, 2008

(54) MODELING LOW FRAME RATE VIDEOS WITH BAYESIAN ESTIMATION

(75) Inventors: Oncel Tuzel, Piscataway, NJ (US); Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 623 days.

(21) Appl. No.: 11/133,894

(22) Filed: May 20, 2005

(65) Prior Publication Data

US 2006/0262959 A1 Nov. 23, 2006

(51) Int. Cl.
*G06K 9/00* (2006.01)
(52) U.S. Cl. .................... 382/103; 382/291; 348/155
(58) Field of Classification Search ............... 382/100, 382/103, 106, 107, 154, 162, 168, 181, 193, 382/194, 203, 220, 232, 243, 260, 274, 276, 382/291, 305, 312, 65, 254, 288; 700/29; 703/2; 348/81, 97, 155; 345/473
See application file for complete search history.

(56) References Cited

U.S. PATENT DOCUMENTS

| | | | | |
|---|---|---|---|---|
| 5,233,541 | A * | 8/1993 | Corwin et al. | 348/81 |
| 6,115,052 | A * | 9/2000 | Freeman et al. | 345/473 |
| 6,591,146 | B1 * | 7/2003 | Pavlovic et al. | 700/29 |
| 6,954,544 | B2 * | 10/2005 | Jepson et al. | 382/107 |
| 7,006,950 | B1 * | 2/2006 | Greiffenhagen et al. | 703/2 |

OTHER PUBLICATIONS

C. Stauffer and E. Grimson, "Adaptive background mixture models for real-time tracking," in Proc. IEEE Conf. on Computer Vision and Pattern RecoQnition, Fort Collins, CO vol. II, 1999, DD. 246-252.*
R. Collins, "Mean-shift blob tracking through scale space," in Proc. IEEE Conf. on Computer Vision and Pattern Recognition, Madison, WI, 2003, pp. 234-240.
D. Comaniciu and P. Meer, "Mean-shift: A robust approach toward feature space analysis," IEEE Trans. Pattern Anal. Machine Intell., vol. 24, pp. 603-619, 2002.
D. Comaniciu, V. Ramesh, and P. Meer, "Kernel-based object tracking," IEEE Trans. Pattern Anal. Machine Intell., vol. 25, pp. 564-577, 2003.
A. Elgammal, D. Harwood, and L. Davis, "Non-parametric model for background subtraction," in Proc. European Conf. on Computer Vision, Dublin, Ireland, vol. II, 2000, pp. 751-767.
N. Friedman and S. Russell, "Image segmentation in video sequences," in Thirteenth Conf. on Uncertainty in Artificial Intelligence (UAI), 1997, pp. 175-181.

(Continued)

*Primary Examiner*—Seyed Azarian
(74) *Attorney, Agent, or Firm*—Dirk Brinkman; Gene Vinokur

(57) ABSTRACT

A video is acquired of a scene. Each pixel in each frame of the video is represented by multiple of layers. Each layer includes multiple Gaussian distributions. Each Gaussian distribution includes a mean and a covariance. The covariance is an inverse Wishart distribution. Then, the layers are updated for each frame with a recursive Bayesian estimation process to construct a model of the scene. The model can be used to detect foreground and background pixels according to confidence scores of the layers.

26 Claims, 3 Drawing Sheets

OTHER PUBLICATIONS

M. Harville, G. Gordon, and J. Woodfill, "Foreground segmentation using adaptive mixture models in color and depth," in IEEE Workshop on Detection and Recognition of Events in Video, 2001, pp. 3-11.

S. Jabri, Z. Duric, H. Wechsler, and A. Rosenfeld, "Location of people in video images using adaptive fusion of color and edge information," in Proc. 15th Int'l Conf. on Pattern Recognition, Barcelona, Spain, vol. 4, 2000, pp. 627-630.

K. Javed, O. Shafique and M. Shah, "A hierarchical approach to robust background subtraction using color and gradient information," in IEEE Workshop on Motion and Video Computing, 2002.

D. Koller, J.Weber, and J. Malik, "Robust multiple car tracking with occlusion reasoning," in Proc. European Conf. on Computer Vision, Stockholm, Sweden, 1994, pp. 189-196.

A. Mittal and N. Paragios, "Motion-based background subtraction using adaptive kernel density estimation," in Proc. IEEE Conf. on Computer Vision and Pattern Recognition, Washington, DC, vol. II, 2004, pp. 302-309.

J. Rittscher, J. Kato, S. Joga, and A. Blake, "A probabilistic background model for tracking," in Proc. European Conf. on Computer Vision, Dublin, Ireland, vol. II, 2000, pp. 336-350.

C. Stauffer and E. Grimson, "Adaptive background mixture models for real-time tracking," in Proc. IEEE Conf. on Computer Vision and Pattern Recognition, Fort Collins, CO, vol. II, 1999, pp. 246-252.

B. Stenger, V. Ramesh, N. Paragios, F. Coetzee, and J. Buhmann, "Topology free hidden Markov models: Application to background modeling," in Proc. 8th Intl. Conf. on Computer Vision, Vancouver, Canada, 2001, pp. 294-301.

K. Toyama, J. Krumm, B. Brumitt, and B. Meyers, "Wallflower: Principles and practice of background maintenance," in Proc. 7th Intl. Conf. on Computer Vision, Kerkyra, Greece, 1999, pp. 255-261.

C. Wren, A. Azarbayejani, T. Darell, and A. Pentland, "Pfinder: Real-time tracking of the human body," IEEE Trans. Pattern Anal. Machine Intell., vol. 19, pp. 780-785, 1997.

T. Zhao and R. Nevatia, "Tracking multiple humans in crowded environment," in Proc. IEEE Conf. on Computer Vision and Pattern Recognition, Washington, DC, vol. II, 2004, pp. 406-413.

* cited by examiner

100

200

MODELING LOW FRAME RATE VIDEOS WITH BAYESIAN ESTIMATION

FIELD OF THE INVENTION

This invention relates generally to computer vision and modeling scenes, and more particularly to tracking objects in videos acquired of scenes at low frame rates.

BACKGROUND OF THE INVENTION

One fundamental task in many computer vision applications segments foreground and background regions in a sequence of frames, i.e., a video, acquired of a scene. The segmentation is useful for higher-level operations, such as tracking moving objects.

One way to detect a region of "moving" pixels in a video is to first acquire a reference frame of a static scene. Then, subsequent frames acquired of the scene are subtracted from the reference frame, on a pixel-by-pixel basis, to segment the video into difference images. The intensity values in the difference images can be thresholded to detect the regions of moving pixels that are likely associated with moving objects in the scene.

Although this task appears fairly simple, in real world applications this approach rarely works. Usually, the background is never static. Instead, the background varies over time due to lighting changes, movement in the background, for example, clouds, leaves in trees, and waves on water, and camera noise. Moreover, in many applications, it is desirable to model different appearances of the background, for example, difference due to sunlight producing slowly moving shadows in the background that are not necessarily associated with moving foreground objects.

To overcome these problems, adaptive background models and filters have been used. For example, a Kalman-filter can model dynamic properties of each pixel, Dieter Koller, Joseph Weber, and Jitendra Malik, "Robust multiple car tracking with occlusion reasoning," ECCV'94, May 1994. A simple version of the Kalman-filter, e.g., the Weiner filter, can make probabilistic predictions based on a recent history of pixel intensity values, K. Toyama, J. Krumm, B. Brumitt, and B. Meyers, "Wallflower: Principles and practice of background maintenance," Proc. 7th Intl. Conf. on Computer Vision, pp. 255-261, 1999.

An alternative method models probability distributions of pixel intensity values, C. R. Wren, A. Azarbayejani, T. J. Darrell, and A. P. Pentland, "Pfinder: Real-time tracking of the human body," PAMI, 19(7), pp. 780-785, July 1997. That method essentially ignores an order in which observations are made. Usually, each pixel is modeled with a normal distribution $N(\mu, \sigma^2)$, which varies over time. Noise is assumed to be coming from a zero-mean, normal distribution $N(0, \sigma^2)$. Hence, a reasonable model to represent such a statistical distribution is a single Gaussian function. The parameters of the model are updated according to an adaptive filter. That model performs adequately when the background of the scene background is uni-modal. However, this is usually not the case in real world applications.

Often, a single Gaussian model is inadequate to accurately model the temporal changes of pixel intensities value in a dynamic background, such a background with changing shadows due to changing lighting conditions. Therefore, more complex systems include mechanisms for rejecting lighting changes, such as intensity variability caused by shadows, Ismail Haritaoglu, David Harwood, and Larry S. Davis, "W4: Who? When? Where? What?" Proceedings of FG'98, IEEE, April 1998.

The use of multiple models to describe dynamic backgrounds at the pixel level was a breakthrough in background modeling. Specifically, methods employing a mixture of Gaussian distributions have become a popular for a large number of related computer vision applications.

A mixture of three Gaussian components can be used to model visual properties of each pixel, N. Friedman and S. Russell, "Image segmentation in video sequences: A probabilistic approach," Thirteenth Conference on Uncertainty in Artificial Intelligence, August 1997. That model also uses an expectation-maximization (EM) process to adapt the Gaussian mixture model (GMM) over time. In a traffic surveillance application, the intensity value of each pixel is restricted to three hypotheses: road, shadow, and vehicles. Unfortunately, that simple assumption significantly degrades the ability of the GMM to model arbitrary distributions for individual pixels. Moreover, that method is computationally demanding.

Another method allows the scene to be non-static, Chris Stauffer and W. E. L. Grimson, "Adaptive background mixture models for real-time tracking," Computer Vision and Pattern Recognition, volume 2, June 1999. In that method, each pixel is modeled as a mixture of Gaussian distributions with a variable number of Gaussian components. Those methods represent the background as a multi-modal process, where each mode is a static model plus a zero-mean, white, Gaussian noise process. The models can be updates in real-time using approximations. That video surveillance system is adequate for day and night cycles, and for scene changes over long periods of time.

That method can be extended by using a feature vector that includes depth information acquired from a pair of stereo cameras, M. Harville, G. Gordon, and J. Woodfill, "Foreground segmentation using adaptive mixture models in color and depth," in IEEE Workshop on Detection and Recognition of Events in Video, pp. 3-11, 2001.

Gradient information can also be used to achieve a more accurate background segmentation, S. Jabri, Z. Duric, H. Wechsler, and A. Rosenfeld, "Location of people in video images using adaptive fusion of color and edge information," Proc. 15th Int'l Conf. on Pattern Recognition, volume 4, pp. 627-630, 2000, and K. Javed, O. Shafique and M. Shah, "A hierarchical approach to robust background subtraction using color and gradient information," IEEE Workshop on Motion and Video Computing, 2002.

Although a mixture of Gaussian models can converge to any arbitrary distribution provided there are a sufficient number of components, that normally requires a large number of components. However, that is not computationally feasible for real time applications. Generally, three to five components are used per pixel.

To address such challenging situations, non-parametric techniques have been developed. Those techniques use kernel densities to estimate background properties at each pixel, based on recently acquired samples. Those techniques can adapt to rapid background changes, Elgammal, D. Harwood, L. S. Davis, "Non-parametric model for background subtraction," ECCV 2000, June 2000. That method uses a normal kernel function for density estimation. The model represents a history of recent sample values over a long video sequence.

Other similar techniques emphasize a variable bandwidth kernel for the purpose of adaptive density estimation. An optical flow can also be used, Anurag Mittal, Nikos Paragios, "Motion-based background subtraction using adaptive kernel density estimation," CVPR 2004, Volume 2, pp. 302-309, June, 2004.

Although non-parametric models seem like a reasonable choice for background modeling, the non-parametric models are time consuming, and cannot be used for real time applications.

Another method represents the scene as discrete states. The states correspond to environmental conditions in the scene. The method switches among the states according to observations. Hidden Markov models (HMMs) are very suitable for this purpose. A three state HMM is used by Rittscher et al., "A probabilistic background model for tracking," Proc. European Conf on Computer Vision, volume II, pp. 336-350, 2000. Another method learns a topology from the observations, B. Stenger, V. Ramesh, N. Paragios, F. Coetzee, and J. Buhmann, "Topology free hidden Markov models: Application to background modeling," Proc. 8th Intl. Conf. on Computer Vision, pp. 294-301, 2001.

Therefore, it is desired to provide a method for modeling a dynamic scene. Furthermore, it is desired to use the model to track objects in videos acquired at very low frame rates.

SUMMARY OF THE INVENTION

The invention provides a method for modeling a scene, and using the model to track moving objects in a video acquired of the scene at a low frame rate, for example, one frame per second (1 fps), or less.

Acquiring a video at a lower frame rate reduces required resources such as processors, network bandwidth and storage media. However, in a low frame rate video, objects move at a speed faster than expected from frame to frame, and there rarely is an overlap of locations of the object in successive frames. Hence, conventional object tracking methods cannot be used. Tracking objects in a video, especially a video acquired at a low frame rate, is a difficult computer vision task.

When a stationary camera is used, an accurate scene model can improve object tracking. Therefore, the invention provides a method for modeling a dynamic scene from a low frame rate video acquired of the scene.

Each pixel is represented with multiple layers of Gaussian distributions to construct the model of the scene. The model is updated on a frame-by-frame basis. Using recursive Bayesian estimation, the method estimates a mean and covariance of each Gaussian distribution.

The method according to the invention preserves multi-modality of the background and estimates the number of necessary layers for representing each pixel.

DETAILED DESCRIPTION OF THE PREFERRED EMBODIMENT

Method Overview

Figure 1:
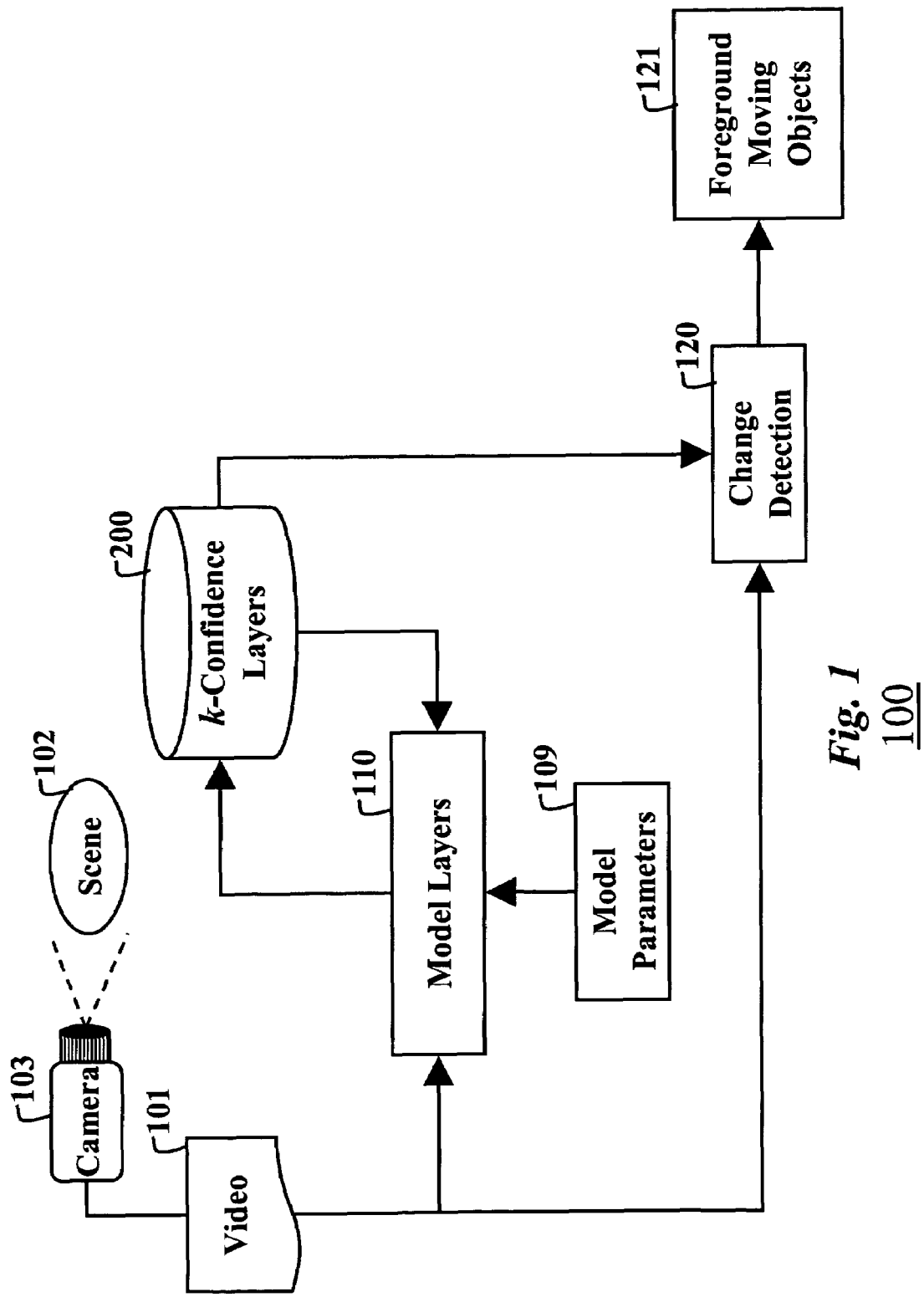
FIG. 1 is a flow diagram of a method for modeling a scene according to the invention.
Figure 3:
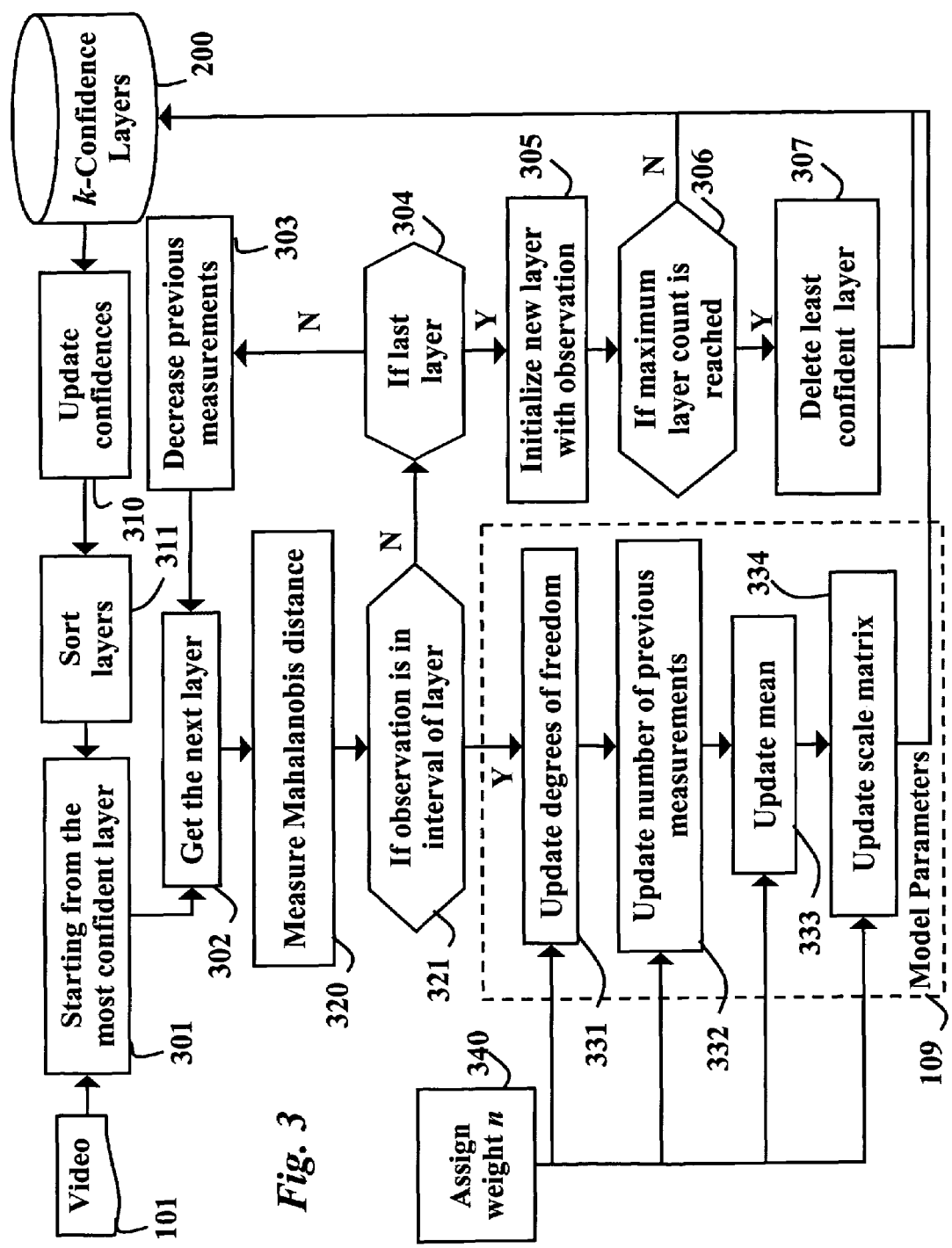
FIG. 3 is a detailed flow diagram of the method of FIG. 1.

FIG. 1 shows a method 100 according to our invention for modeling a scene 102 in order to detect moving objects in the scene. A video 101 is acquired of the scene 102 with a camera 103. For each pixel in each frame of the video, the scene is modeled 110 by multiple layers 200 of 3D multivariate Gaussian distributions according to model parameters 109. Each layer corresponds to a different appearance, i.e., color intensity, of the pixel over time. We perform our operations in a red, green, and blue (RGB) color space. Changes in the layers of the scene model are determined to detect 120 moving objects 121 in the scene. The detailed steps of the method are shown in FIG. 3, described below.

Model Layers

Figure 2:
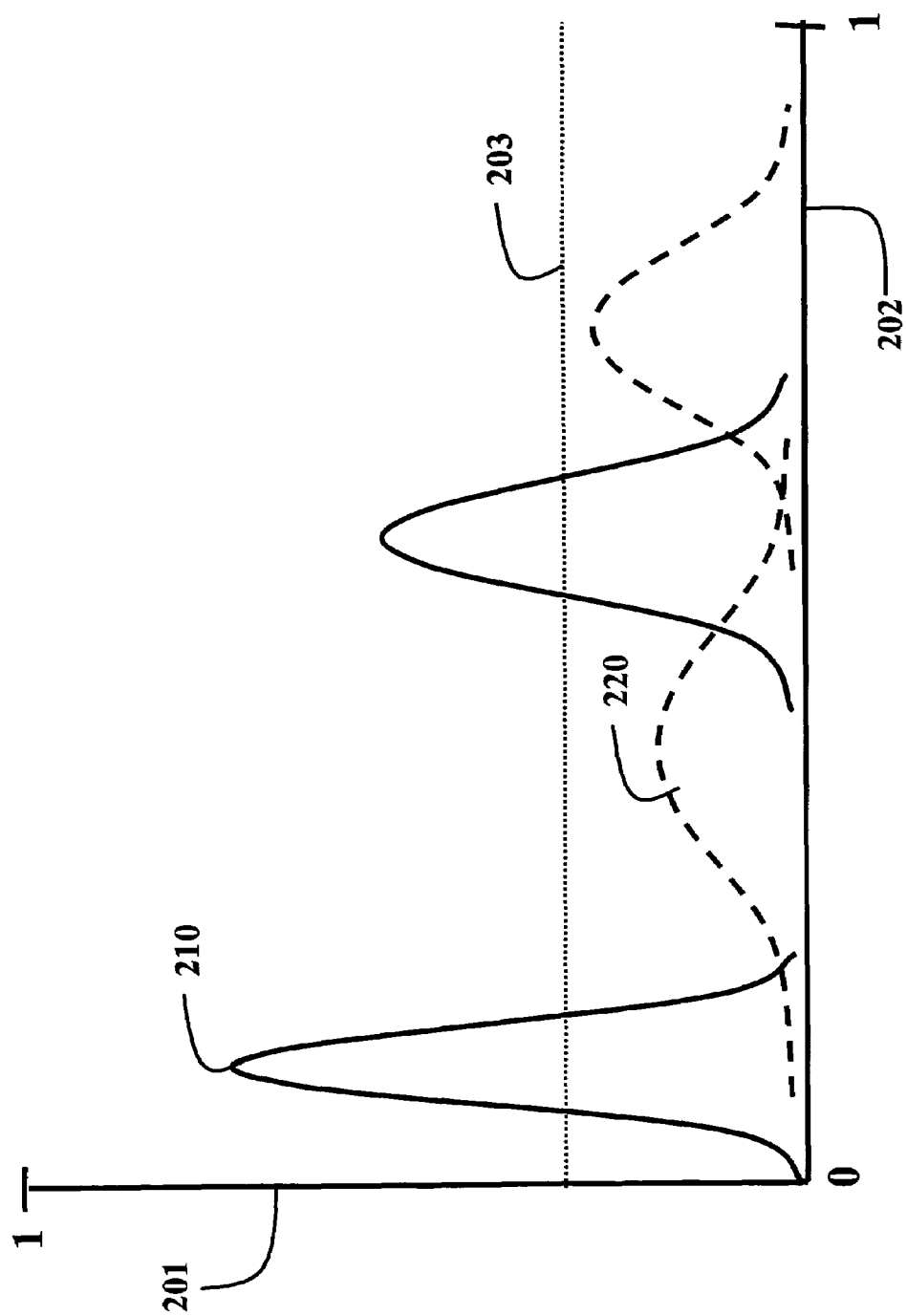
FIG. 2 is a schematic of a model of the scene including multiple layers of Gaussian distributions according to the invention.

FIG. 2 is a simplified schematic of the multiple layers 200 of the model according to our invention. A vertical axis 201 indicates a confidence score, and a horizontal axis 202 a pixel color value, both normalized to a range [0, 1]. If a layer is less than a predetermined confidence threshold 203, it is considered to model the background in the scene, otherwise the layer models the foreground. For the example shown, a layer 210 is considered the 'most confident' foreground layer, and a layer 220 is the 'least confident' background layer.

Recursive Bayesian Estimation

Although we use a recursive Bayesian estimation for updating the model, we do not estimate the mean and variance parameters of each layer, instead we estimate probability distributions of the mean and variance of each Gaussian distribution, as shown in FIG. 2. Then, we extract statistical information of the model parameters of the layers from the probability distributions. We detect changes in a scene by using expectations of the mean and variance. The variance of the mean is an embedded confidence score 201 of our recursive Bayesian estimation.

Prior knowledge can be integrated in our method with prior parameters. Because we determine a full covariance matrix, our feature space can be modified to include other information, such as motion information.

The multi-modality of our scene model is maintained by a recursive Bayesian update process. During each update, at most, one layer is updated according to the pixels values of the current frame. This assures a minimum overlap between the layers of the model. We also determine how many layers are necessary to best represent each pixel, and use only the necessary layers when we segment background and foreground pixels. This is performed according to the confidence scores embedded in our model.

Multiple Layer Model

We assume that the pixel color intensities in the video, are normally distributed with a mean $\mu$ and a covariance $\Sigma$. The mean and variance are unknown and modeled as random variables. According to Bayes theorem, the joint posterior density can be expressed as:

$$p(\mu,\Sigma|X) \propto p(X|\mu,\Sigma)p(\mu,\Sigma). \quad (1)$$

To perform recursive Bayesian estimation with new pixel values during the updating, the joint prior density $p(\mu, \Sigma)$ has the same form as the joint posterior density $p(\mu,\Sigma|X)$. When conditioned on the variance, the joint prior density can be expressed as:

$$p(\mu,\Sigma)=p(\mu|\Sigma)p(\Sigma). \quad (2)$$

The above condition is realized when we assume an inverse Wishart distribution for the covariance, and a multivariate normal distribution for the mean conditioned on the covariance. The inverse Wishart distribution is a multivariate generalization of a scaled inverse-$\chi^2$ distribution.

The parameterization of the Wishart distribution is $$\Sigma \sim \text{Inv-Wishart}_{v_{t-1}}(\Lambda_{t-1}^{-1}) \quad (3)$$

$$\mu|\Sigma \sim N(\theta_{t-1},\Sigma/\kappa_{t-1}). \quad (4)$$

where $v_{t-1}$ and $\Lambda_{t-1}$ are respectively the degrees of freedom 331 and the scale matrix 334 for the inverse Wishart distribution, $\theta_{t-1}$ is the mean 333 of the previous density, and $\kappa_{t-1}$ is the number of previous density measurements 332, see FIG. 3. With these assumptions, the joint prior density becomes $$p(\mu, \Sigma) \propto |\Sigma|^{-((v_{t-1}+3)/2+1)} \times e^{(-\frac{1}{2}tr(\Lambda_{t-1}\Sigma^{-1})-\frac{\kappa_{t-1}}{2}(\mu-\theta_{t-1})^T\Sigma^{-1}(\mu-\theta_{t-1}))}, \quad (5)$$

for a feature space with three dimensions.

We label this as a normal-inverse-Wishart distribution $$(\theta_{t-1}, \Lambda_{t-1}/\kappa_{t-1}; v_{t-1}, \Lambda_{t-1}).$$

Multiplying the prior density by the normal likelihood, and arranging the terms, the joint posterior density becomes a normal-inverse-Wishart distribution $(\theta_{t-1}, \Lambda/\kappa_{t-1}, \Lambda_{t-1})$. The parameters 109 are updated according to:

$$v_t = v_{t-1} + n \quad \kappa_n = \kappa_{t-1} + n \quad (6)$$

$$\theta_t = \theta_{t-1}\frac{\kappa_{t-1}}{\kappa_{t-1}+n} + \bar{x}\frac{n}{\kappa_{t-1}+n} \quad (7)$$

$$\Lambda_t = \Lambda_{t-1} + \sum_{i=1}^n (x_i - \bar{x})(x_i - \bar{x})^T + n\frac{\kappa_{t-1}}{\kappa_t}(\bar{x} - \theta_{t-1})(\bar{x} - \theta_{t-1})^T \quad (8)$$

where $\bar{x}$ is the mean of new samples, and n is the number of samples used to update the model, see FIG. 3.

If the recursive Bayesian update is performed for each frame, then n becomes one. To speed up the system, the update can be performed periodically.

We update one quarter of the model for each frame, therefore the weight n is assigned 340 four. The new parameters combine the previous measurement 332 with the observed samples. The posterior mean $\theta_t$ is a weighted average of the prior mean and the sample mean. The posterior degrees of freedom are equal to the prior degrees of freedom plus the sample size. Our model is initialized with the following parameters:

$$\kappa_0=10, v_0=10, \theta_0=x_0, \Lambda_0=(v_0-4)16^2I \quad (9)$$

where I is a three-dimensional identity matrix.

By integrating the joint posterior density with respect to the covariance $\Sigma$, we obtain the marginal posterior density for the mean:

$$p(\mu|X) \propto t_{v_t-2}(\mu|\theta_t, \Lambda_t/(\kappa_t(v_t-2))) \quad (10)$$

where $t_{v_t-2}$ is a multivariate t-distribution with $v_t-2$ degrees of freedom.

We use the expectations of the marginal posterior distributions for the mean and the covariance as the parameters of our model at a time t. Then, the expectation for the marginal posterior mean, i.e., the expectation of the multivariate t-distribution, becomes:

$$\mu_t = E(\mu|X) = \theta_t \quad (11)$$

and the expectation of the marginal posterior covariance, i.e., the expectation of the inverse Wishart distribution, becomes:

$$\Sigma_t = E(\Sigma|X) = (v_t-4)^{-1}\Lambda_t. \quad (12)$$

Our confidence score for the layer is equal to one over the determinant of the covariance of $\mu|X$:

$$C = \frac{1}{|\Sigma_{\mu|X}|} = \frac{\kappa_t^3(v_t-2)^4}{(v_t-4)|\Lambda_t|}. \quad (13)$$

If the marginal posterior mean has a large variance, then the layer is less confident. The variance of the multivariate t-distribution with a scale matrix $\Sigma$ and degrees of freedom $v$ is equal to $$\frac{v}{v-2}\Sigma \text{ for } v > 2.$$

Making independent assumptions for each color channel can accelerate the method. The update of the full covariance matrix determined nine parameters. Moreover, during distance estimation, we invert the full covariance matrix. Instead of a single multivariate Gaussian distribution for a single layer, we use three univariate Gaussian distributions, one for each color channel in the video. After updating each color channel independently, we join the variances, and construct a diagonal covariance matrix for the three (rgb) colors:

$$\Sigma_t = \begin{pmatrix} \sigma_{t,r}^2 & 0 & 0 \\ 0 & \sigma_{t,g}^2 & 0 \\ 0 & 0 & \sigma_{t,b}^2 \end{pmatrix}. \quad (14)$$

In this case, for each univariate Gaussian, we assume a scaled inverse-$\chi^2$ distribution for the variance conditioned on the variance univariate normal distribution for the mean.

Model Update

As shown in FIG. 3, we initialize our model 200 with k layers of Gaussian distributions for each pixel. Usually, we select three to five layers, depending on the complexity of the scene. Additional layers can be used for highly dynamic scenes. As we observe new samples x for each pixel, we update the parameters 109 of our model.

We start 301 our update from the most confident layer 210 in our current model. If the observed sample is inside the 99% confidence interval of the current model, then the parameters of the model are updated according Equations (6), (7) and (8). Lower layers are not updated.

For modeling the background, it is useful to have a 'forgetting' mechanism so that earlier observations have less effect on the model. Thus, changes in the background are dynamically adapted over time. Forgetting is performed by reducing the number of parameters of prior observations of an unmatched model. If the current sample is outside the confidence interval, then we update the number of prior measurements parameter 332 as:

$$\kappa_t = \kappa_{t-1} - n \quad (15)$$

and proceed 302 with the update of the next confident layer. We do not let $\kappa_t$ become less than the initial value ten.

If none of the layers are updated, then we delete ('forget') 303 the least confident layer and initialize a new layer having the current sample as the initial mean and a variance. The update process for a single pixel can be summarized as follows.

Input to the update process is a new sample x at time t, and k background layers $\{(\theta_{t-1}, \Lambda_{t-1}, i, \kappa_{t-1}, v_{t-1}, i)\}$ for $i=1, \ldots, k$, at time $t-1$.

First, update 310 the confidence scores and sort 311 the layers according to the confidence score defined in Equation (13). Then, while i is less than k, for each next layer, measure 320 the Mahalanobis distance:

$$d_i \leftarrow (x - \mu_{t-1,i})^T \sum_{t-1}^{-1} x - \mu_{t-1,i}).$$

If the sample x is in the 99% confidence interval 321, then update the parameters 109 of the model according to equations (6), (7), (8), as described above. The parameters that are updated include the degrees of freedom 331, the number of previous measurements 332, the mean, 333, and the scale matrix 334.

Else, update the model parameters 109 according to equation (15), increment 340 the layer index i, and do the next layer. After all layers have been updated 304, initialize 305 a new layer having parameters defined according to Equation (9). If a maximum layer count is reached 306 delete 307 the last layer k, i.e., the layer 220 with the least confidence score.

This update process suppresses noise or foreground pixels in the background portion of the model. In addition, the update process adapts to smooth intensity changes, such as, lighting effects. The embedded confidence score determines the number of layers to be used and prevents unnecessary layers.

Typically, the secondary layers correspond to a shadowed form of the background pixel, or different colors of the moving regions of the scene. If the scene is uni-modal, then the confidence scores of layers, other than first layer, become very low.

Comparison with Online-Expectation Maximization (EM)

Although our model looks similar to the model produced by Stauffer et al., see above, there are major differences. In the Stauffer model, each pixel is represented as a mixture of Gaussian distributions. Parameters of Gaussian distributions and mixing coefficients are updated with an online K-means approximation of expectation maximization (EM). That method is very sensitive to initial observations. If the Gaussian distributions are improperly initialized, then every component eventually converges to the most significant mode of the distribution. Smaller modes in the vicinity of larger modes are never detected.

In contrast, we model each pixel with multiple layers of Gaussian distributions, and perform recursive Bayesian estimation to determine the probability distribution of the parameters of our model. We interpret each layer as being independent of every other layer. Thus, our method is more flexible.

Foreground Segmentation

The estimated statistics of the scene model can be used to detect regions that are 'changing' in the scene, i.e., presumably regions of pixels corresponding to moving objects. Because the number of layers required to represent a pixel is not known beforehand, the model is initialized with more layers than required.

Using the confidence scores, we determine how many layers are significant for each pixel. We sort 311 the layers according to confidence score as determined by Equation (13), and select only those layers that have a confidence score greater than the predetermine threshold $T_c$ 203.

We refer to these layers as 'confident layers'. The threshold $T_c$ 203 is dependent on the covariance of the mean of the pixel intensity. Therefore, the threshold is dependent on the color range 202 of the pixel. For different color ranges the threshold $T_c$ can be modified.

We measure 320 the Mahalanobis distance of observed color from the confident layers. Pixels that are outside of the 99% confidence interval of all confident layers are considered as foreground (moving) pixels. Finally, connected component analysis is performed on foreground pixels to detect a moving object.

Motion, Texture and Orientation

As described above the scene model represents the colors of the pixels in the video. It is also possible to augment the model with motion, texture, and orientation features of the pixels. For example, it is possible to determine, for each pixel, a motion, texture and orientation, in addition to the color. The orientation of the pixels can be determined from pixel intensity gradients. The motions, textures and orientations can then likewise by represented by multiple motion, texture and orientation layers of Gaussian distributions, as described above, to construct corresponding motion, texture and orientation models of the scene.

Effect of the Invention

The invention provides an efficient method for modeling a scene using recursive Bayesian estimation. The scene model is very effective for representing multi-modal scenes. Using the model, tracking moving objects in a video acquired at a low frame rate is enabled. The time to process one frame is 0.05 seconds for a 320×240 colored video monitor on a Pentium IV 2.4 GHz processor with five layers per pixel. Therefore, the method according to the invention can also work for videos acquired at higher frame rates.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for modeling a scene, comprising:
   acquiring a video of a scene;
   representing each pixel in each frame of the video with a plurality of layers, each layer including a plurality of Gaussian distributions, each Gaussian distribution including a mean and a covariance, the covariance being an inverse Wishart distribution; and
   updating, for each frame, the plurality of layers with a recursive Bayesian estimation process to construct a model of the scene, and in which the recursive Bayesian estimation process determines a probability distribution of the mean and the covariance of each Gaussian distribution over time, and in which a variance of the mean is a confidence score of each layer according to the Bayesian estimation process.

2. The method of claim 1, further comprising:
   assigning the means of the estimated probability distributions as parameters of the layers of the model.

3. The method of claim 1, in which each layer of each pixel corresponds to a different appearance of the pixel over time.

4. The method of claim 1, further comprising:
   determining changes in the plurality of layers to detect moving objects in the scene.

5. The method of claim 1, in which layers having a confidence score less than a predetermined threshold represent background pixels, and foreground pixels otherwise.

6. The method of claim 1, in which each layer is represented as three univariate Gaussian distributions, one univariate distribution for each color channel in the video.

7. The method of claim 1, in which a number of the layers depends on a complexity of the scene.

8. The method of claim 1, further comprising:
deleting, over time, layers having low confidences; and
initializing new layers.

9. The method of claim 1, in which the video is acquired at a frame rate of one frame per second.

10. The method of claim 1, further comprising:
measuring a Mahalanobis distance for each layer.

11. The method of claim 1, further comprising:
storing a set of previously sampled color values for each pixel;
decreasing a rate of the updating; and
using previously sampled color values for the recursive Bayesian estimation process.

12. The method of claim 1, further comprising:
determining a motion for each pixel in each frame;
representing the motion of each pixel in each frame of the video with a plurality of motion layers; and
updating, for each frame, the plurality motion layers with the recursive Bayesian estimation process to construct a motion model of the scene.

13. The method of claim 1, further comprising:
determining a texture for each pixel;
representing the texture of each pixel in each frame of the video with a plurality of texture layers; and
updating, for each frame, the plurality texture layers with the recursive Bayesian estimation process to construct a texture model of the scene.

14. The method of claim 1, further comprising:
determining a gradient for each pixel;
determining an orientation of each pixel according to the gradient;
representing the orientation of each pixel in each frame of the video with a plurality of orientation layers; and
updating, for each frame, the plurality orientation layers with the recursive Bayesian estimation process to construct an orientation model of the scene.

15. A method for modeling a scene, comprising:
acquiring a video of a scene; and
updating, for each pixel in each frame of the video, a first mean and a first covariance of a color of the pixel and a second mean and a second covariance of the first covariance, using a recursive Bayesian estimation process, in which the recursive Bayesian estimation process determines a probability distribution of the mean and the covariance of each Gaussian distribution over time, and in which a variance of the mean is a confidence score of each layer according to the Bayesian estimation process.

16. The method of claim 15 further comprising:
representing, for each pixel, the first mean, the first covariance, the second mean and the second covariance as a plurality of layers, each layer including a plurality of Gaussian distributions.

17. The method of claim 15 in which the first covariance and the second covariance are inverse Wishart distributions.

18. The method of claim 15 further comprising:
determining changes in the first mean, the first covariance, the second mean and a second covariance to detect moving objects in the scene.

19. The method of claim 15 in which the recursive Bayesian estimation process determines a probability distribution of the mean and a variance of each Gaussian distribution over time, and in which an inverse of the variance of the mean is a confidence score of each layer.

20. The method of claim 19 in which layers having a confidence score more than a predetermined threshold represent background pixels, and foreground pixels otherwise.

21. The method of claim 15 in which each layer is represented as a multitude of multivariate Gaussian distributions, one multivariate distribution for all color channels in the video.

22. The method of claim 15 in which a maximum number of the layers depends on a complexity of the scene.

23. The method of claim 15 further comprising:
measuring a Mahalanobis distance for each layer from the observed color of each pixel in the current frame of the video.

24. The method of claim 23 further comprising:
decreasing, over time, the confidence of a layer in which the computed Mahalanobis distance is larger than a threshold proportional to the covariance of the layer;
deleting, over time, layers having low confidences; and
initializing new layers.

25. The method of claim 15 further comprising:
incrementing a number of prior measurements that updates the layer mean, a degree of freedom, and a layer scale matrix.

26. The method of claim 15 further comprising:
storing a set of previous color values for each pixel, decreasing a frame rate of the updating;
adjusting an update parameter equal to the number of color values in the set; and
using the set of color values and update parameter for the recursive Bayesian estimation process.

* * * * *